United States Patent [19]

Ishiguro et al.

[11] Patent Number: 5,175,527
[45] Date of Patent: Dec. 29, 1992

[54] DETECTING ELEMENT WITH ADHESIVE LAYER INCLUDING UNEVENLY DISTRIBUTED GLASS AND METAL COMPONENTS

[75] Inventors: Fujio Ishiguro; Toru Kikuchi, both of Nagoya, Japan

[73] Assignee: NGK Insulators, Ltd., Japan

[21] Appl. No.: 669,013

[22] Filed: Mar. 13, 1991

[30] Foreign Application Priority Data

Mar. 16, 1990 [JP] Japan .................... 2-67905

[51] Int. Cl.$^5$ .............................................. H01C 3/04
[52] U.S. Cl. ...................... 338/25; 338/22 R; 73/204.25; 252/514
[58] Field of Search .......... 338/22 R, 22 S D, 25, 338/34; 252/514, 521, 512, 513; 73/204.11, 204.25, 204.26

[56] References Cited

U.S. PATENT DOCUMENTS

| | | | |
|---|---|---|---|
| 4,398,169 | 8/1983 | Hayashi | 338/25 |
| 4,447,799 | 5/1984 | Carlson | 338/22 R |
| 4,513,615 | 4/1985 | Sato et al. | 73/204 |
| 4,903,001 | 2/1990 | Kikuchi | 338/22 R |
| 4,904,415 | 2/1990 | Lau et al. | 252/514 |
| 4,999,460 | 3/1991 | Sugiyama et al. | 252/512 |
| 5,084,694 | 1/1992 | Kikuchi et al. | 338/22 R X |

FOREIGN PATENT DOCUMENTS 56196326 12/1979 Japan .

*Primary Examiner*—Marvin M. Lateef
*Attorney, Agent, or Firm*—Parkhurst, Wendel & Rossi

[57] ABSTRACT

A detecting element for a thermal flow meter, which includes a support having a bearing surface, an electrically resistive body formed on the bearing surface of the support, an electrical conductor which is fixedly secured to the support by means of an adhesive, and an adhesive layer made of the adhesive. The conductor is electrically connected to the electrically resistive body through the adhesive layer. The adhesive layer consists essentially of a glass component and a metal component, such that the glass component has a larger volume than the metal component, and such that the glass and metal components are unevenly distributed in the adhesive layer.

10 Claims, 3 Drawing Sheets

DETECTING ELEMENT WITH ADHESIVE LAYER INCLUDING UNEVENLY DISTRIBUTED GLASS AND METAL COMPONENTS

BACKGROUND OF THE INVENTION

1. Field of the Invention

The present invention relates in general to a detecting element for a flow meter, and more particularly to a detecting element for a thermal flow meter, which is suitably used to determine an amount of intake air introduced into an internal combustion engine, for example.

2. Discussion of the Prior Art

In a known type of detecting element for a thermal flow meter, electrical conductors or leads are fixedly secured by means of an adhesive to a support on which an electrically resistive body is formed, such that the conductors and the electrically resistive body are electrically connected to each other through an adhesive layer formed of the adhesive. An example of this type of detecting element is disclosed in laid-open publication No. 56-96326 of unexamined Japanese Utility Model Application.

More specifically described referring to FIG. 1, the detecting element of the above type employs a ceramic tube 2 as the support, which is formed of alumina or other ceramic materials, and a platinum layer 4 as the electrically resistive body, which is obtained by fired forming a platinum thin film on the outer circumferential surface of the ceramic tube 2, and then suitably patterning the applied platinum film so that the obtained platinum layer 4 has a predetermined resistance value. A pair of electrical conductors or lead wires 6, 6 made of platinum are secured to opposite open end portions of the ceramic tube 2, with a platinum paste (8) as the adhesive applied to each of the opposite end portions of the tube 2. The masses 8 of the platinum paste are held in contact with respective end portions of the lead wires 6, 6, and the corresponding ends of the platinum layer 4, for electrical connection between the lead wires 6 and the platinum layer 4. The thus constructed detecting element is substantially entirely covered with a protective coating 10 made of glass, for example.

In practical use of the detecting element of the type as described above, the lead wires 6 are fixed to metallic terminals by welding, for example, so that the detecting element is placed in an intended position in a fluid passage. FIG. 2 illustrates one application of a thermal flow meter using two detecting elements 16 constructed as described above. The detecting elements 16 are disposed within a gas passage 14 which is defined by a pipe 12 such as an iron pipe, so as to detect an amount of a gaseous fluid which flows through the gas passage 14. In this case, each detecting element 16 is held in position within the pipe 12, such that the opposite end portions of the element 16, i.e., free end portions of the lead wires 6, 6 are fixed by welding, for example, to respective metallic terminals 20, 20, such as stainless rods. These metallic terminals 20 are inserted into the pipe 12, through respective electrically insulating members 18 which are fitted in holes formed through the cylindrical wall of the pipe 12. The metallic terminals 20 are connected to an external control circuit for determining the amount of the gaseous fluid through the passage 14.

In the known detecting element 16, however, excellent electrical conduction between the platinum layer 4 and the lead wires 6 through the masses 8 of the platinum adhesive is incompatible with excellent fixation of the lead wires 6 to the ceramic tube 2 by using the same adhesive masses 8. If preference is given to the electrical conduction as described above, the detecting element 16 suffers from a reduced degree of fixation of the lead wires 6 to the ceramic tube 2, i.e., insufficient bonding strength between the lead wires 6 and the ceramic tube 2. Consequently, the lead wires 6 tend to be removed off the platinum adhesive masses 8 when the wires 6 are welded to the metallic terminals 20, or the operating characteristics of the detecting element 16 are likely to be varied during its use. If preference is given to the fixation of the lead wires 6 to the ceramic tube 2, by increasing the amount of a glass component of the platinum paste (8), the detecting element 16 suffers from excessively low electrical conductivity between the platinum layer 4 and the lead wires 6.

SUMMARY OF THE INVENTION

It is therefore an object of the present invention to provide a detecting element for a thermal flow meter, which is excellent in terms of both electrical conduction between an electrical conductor and an electrically resistive body, and fixation of the conductor with respect to a support on which the resistive body is formed.

The above object may be achieved according to the principle of the present invention, which provides a detecting element for a thermal flow meter, comprising: a support having a bearing surface; an electrically resistive body formed on the bearing surface of the support; an electrical conductor which is fixedly secured to the support by means of an adhesive; and an adhesive layer made of the adhesive. The conductor is electrically connected to the electrically resistive body through the adhesive layer. The adhesive layer consists essentially of a glass component and a metal component, such that the glass component has a larger volume than the metal component, and such that the glass and metal components are unevenly distributed in the adhesive layer.

The volume of the glass component is preferably held within a range of 55%~90% of the total volume of the adhesive layer.

Preferably, the adhesive layer has a plurality of glass-rich portions formed solely of the glass component, as viewed in cross section of the adhesive layer, such that the total cross sectional area of the glass-rich portions each having at least 20 m$^2$, is at least 100 $\mu$m$^2$, preferably at least 500 $\mu$m$^2$, per 2500 $\mu$m$^2$ of a cross sectional area of the adhesive layer.

It is also preferable that the metal component is selected from the platinum group or from the alloys thereof.

In the detecting element of the present invention constructed as described above, the adhesive layer provided for securing the conductor to the support consists essentially of a glass component serving as an adhesive, and a metal component serving as an electrical conductor. Since the glass component has a larger volume than the metal component, and these components are unevenly distributed in the adhesive layer, the electrical resistance of the adhesive layer is significantly reduced, assuring excellent fixation of the conductor to the support due to the increased volume of the glass component.

The increase in the volume of the glass component also leads to improved air tightness of the adhesive layer, preventing various substances such as water, salt and chemicals from permeating into the adhesive layer. Accordingly, the adhesive layer has improved resistance to moisture, for example, and is therefore unlikely to undergo a chronological change of the resistance value thereof. Thus, the durability of the adhesive layer is enhanced.

Since the chronological change of the resistance value of the adhesive layer can be avoided due to improved air tightness of the adhesive layer, the adhesive layer of the present detecting element need not be covered with a protective glass coating, as in the conventional detecting element. Thus, the present detecting element is relatively easy to manufacture.

BRIEF DESCRIPTION OF THE DRAWINGS

The foregoing and other objects, features and advantages of the present invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
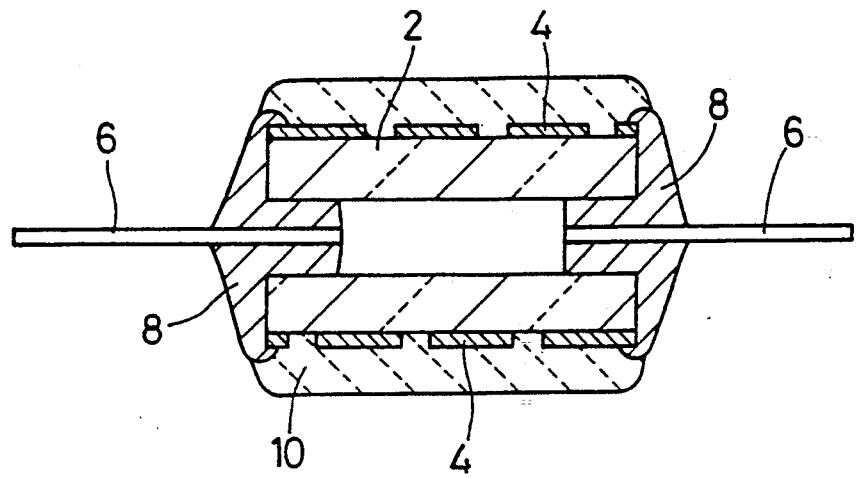
FIG. 1 is a schematic elevational view in longitudinal cross section of one example of a detecting element used for a thermal flow meter.
Figure 2:
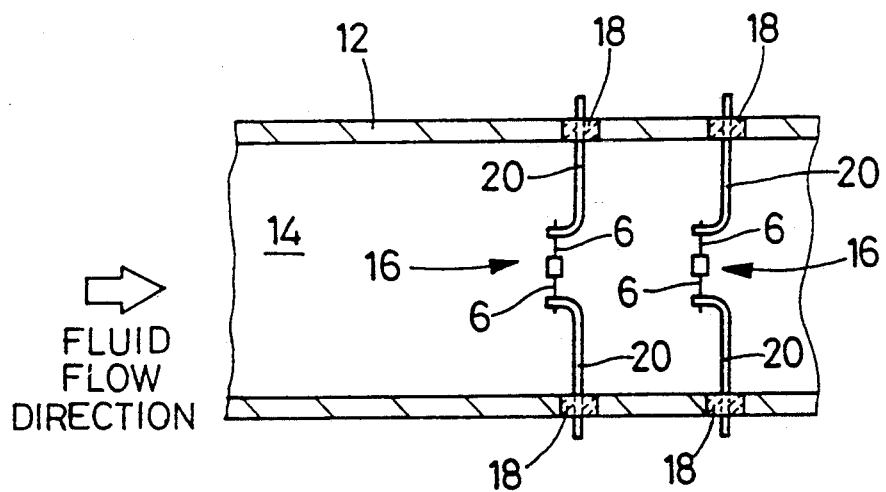
FIG. 2 is a schematic explanatory view showing an arrangement in which the detecting elements as shown in FIG. 1 are disposed in the thermal flow meter.

The detecting element for a thermal flow meter according to the present invention has the same structure as that of the conventional detecting element as described above, except for the adhesive (adhesive layer) for securing the electrical conductors or leads to the support which bears the electrically resistive body on its outer surface. The present invention may be applied not only to the detecting element as shown in FIG. 1, but also to any other known detecting elements having various other structures.

Namely, the electrically resistive body, support and electrical conductor of the present detecting element may be formed of properly selected materials, and may be shaped in properly selected configurations, according to the particular application or utility of the detecting element. For example, the support may be an electrically insulating member having various configurations, such as tubular, rod-like or planar configuration. Generally, a ceramic support formed of alumina or other ceramic materials is preferred, and such a ceramic support having a tubular shape is particularly preferred. As the electrically resistive body, a thin film or layer made of platinum is preferably used.

In the detecting element for a flow meter of the present invention, the electrical conductor is fixedly secured to the support which bears the electrically resistive body on its outer surface, such that an adhesive is applied to a spacing between the conductor and the support to thereby form an adhesive layer therebetween. This adhesive layer is held in contact with the conductor and the electrically resistive body formed on the support, so as to permit electrical conduction between the conductor and the resistive body. The adhesive layer is formed of an adhesive essentially consisting of a glass component and a metal component, such that the volume of the glass component is larger than that of the metal component, and such that the glass and metal components are unevenly distributed within the mass of the adhesive layer.

More specifically, the adhesive layer of the present detecting element is prepared such that the glass component is incompletely mixed with the metal component, that is, the glass and metal components are locally unevenly distributed in the adhesive layer. Therefore, the adhesive layer substantially consists of glass-rich portions formed solely of the glass component, and metal-rich portions formed solely of the metal component. Each glass-rich or metal-rich portion consists of glass or metal particles, respectively, which gather together into local coherent masses. With the volume of the glass component being larger than that of the metal component, the glass component which is locally coherently present in the adhesive layer assures increased bonding strength of the adhesive layer. Namely, the glass-rich portions of the adhesive layer serve to enhance the adhesion thereof with respect to the conductor and the support, while the remaining metal-rich portions serve to enhance the electrical conduction (or reduce the electrical resistance) between the conductor and the electrically resistive body.

To more effectively provide the above-described advantages of the present invention, it is desirable that the volume of the glass component ranges from 55% to 90% of the total volume of the adhesive layer. If the volume of the glass component exceeds 90%, the metal-rich portions of the adhesive layer are excessively small, resulting in poor electrical conduction between the conductor and the electrically resistive body. It is also desirable that the glass-rich portions are distributed in the adhesive layer such that as viewed in cross section of the adhesive layer, the total cross sectional area of the glass-rich portions which have 20 $\mu m^2$ or larger, is at least 100 $\mu m^2$, preferably, at least 500 $\mu m^2$, per 2500 $\mu m$, of a cut surface of the adhesive layer parallel to the cross sectional plane. In this case, the bonding strength of the adhesive layer is significantly increased.

The adhesive providing the adhesive layer is prepared by mixing a glass powder with a metallic powder. The glass or metallic powder may be a properly selected one of known materials. For example, the glass powder may be selected from powders of borosilicate glass, alkali glass, glass containing zinc, glass containing magnesia, lead glass, phosphate glass, and crystallized glasses thereof. The metallic powder may be selected from powders of pure metals of the platinum group, such as platinum, rhodium, and palladium, and alloys thereof or containing other metals such as nickel and copper, or from powders of metals such as gold and silver, and alloys thereof. The glass powder may be prepared by mixing a ceramic powder with the selected glass powder, and the metallic powder may be prepared from suitably selected ceramic or metallic particles whose surfaces are coated with platinum or other metals. Generally, powders of pure metals of the platinum group or alloys thereof are preferably used as the metallic powder contained in the adhesive.

The glass and metallic powders as described above are mixed in a predetermined proportion, with a suitable solvent or binder, to provide an adhesive paste for the adhesive for bonding the electrical conductor and the support. In preparation of the adhesive paste, the glass and metallic powders are not mixed or stirred for such a long time as to permit a uniform or intimate mixture as in an ordinary mixing procedure, but are simply mixed for a relatively short time such that the mixed glass and metallic components are unevenly dispersed in the obtained adhesive paste. The thus prepared adhesive paste is used for forming the adhesive layer in which the glass and metal component masses are locally unevenly present.

For securing the conductor to the support which bears the electrically resistive body on its outer surface, by using the adhesive paste prepared by mixing the glass and metallic powders as described above, the conductor is fixed in place with respect to the support by means of the adhesive paste applied therebetween, to thereby form an integral assembly, and this assembly is subsequently heat-treated or fired so that the adhesive paste gives the adhesive layer between the conductor and the support. Thus, the conductor and the support are firmly adhered to each other. Since the glass powder and the metallic powder are unevenly dispersed in the adhesive paste, the glass component and the metal component are locally unevenly distributed in the adhesive layer, assuring excellent electrical conduction between the conductor and the electrical resistive body, and excellent fixation of the conductor with respect to the support.

Figure 3A:
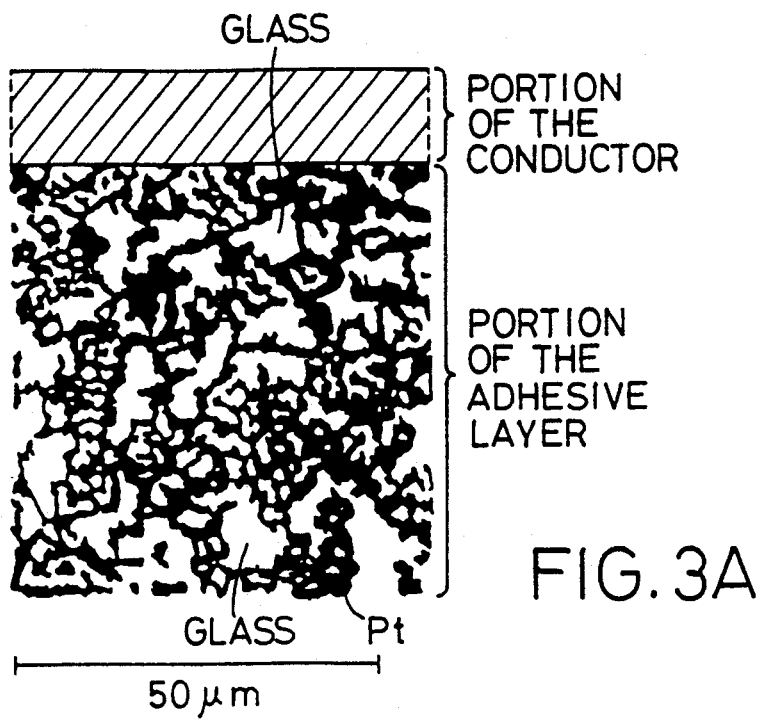
FIGS. 3(a) and 3(b) are fragmentary illustrations of a cut surface of an adhesive layer of the detecting element constructed according to the present invention, as observed by a scanning electron microscope.
Figure 3B:
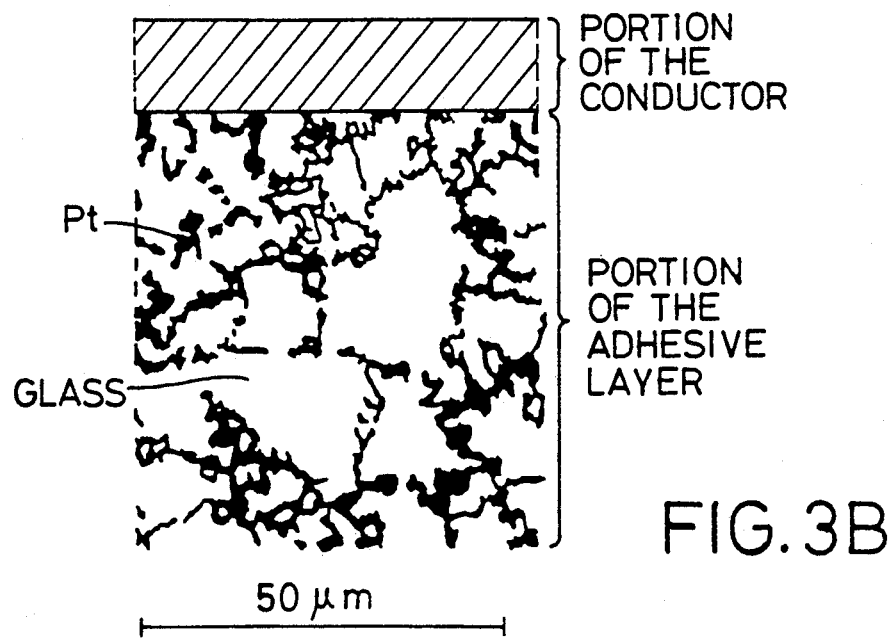

FIGS. 3(a) and 3(b) are illustrations of a cut surface including a portion of the conductor and a portion of the adhesive layer for securing the conductor in place, as observed by a scanning electron microscope. In either case of FIGS. 3(a) and 3(b), the glass and metal components are unevenly distributed in the adhesive layer. In FIG. 3(a), the volume of the glass component amounts to 65% of the total volume of the adhesive layer, while in FIG. 3(b), the volume of the glass component amounts to 80% of that of the adhesive layer.

To further clarify the concept of the present invention, there will be described in detail some specific examples of the detecting element of the invention. However, it is to be understood that the invention is not limited to the precise details of these examples, but the invention may be embodied with various other changes, modifications and improvements which may occur to those skilled in the art, without departing from the spirit and scope of the invention.

EXAMPLES 1-10

Examples of detecting element having a structure as shown in FIG. 1 were prepared by using an alumina tube as the support, which has an inside diameter of 0.3 mm, and an outside diameter of 0.5 mm, and a length of 2 mm. After a masking agent was applied to the outer circumferential surface of the alumina tube, to form a spiral mask thereon, a platinum film having a thickness of 1 μm was formed on the same outer surface of the alumina tube, by a sputtering technique. Then, the alumina tube with the platinum film was heat-treated so that the spiral mask and a portion of the platinum film formed on the mask were removed from the outer surface of the alumina tube, to thereby provide a patterned platinum layer which is defined by a spiral groove corresponding to the thus removed spiral mask. This platinum layer had an electrical resistance value of 15~17Ω.

A pair of electrical conductors or lead wires having a diameter of 0.2 mm were fixedly secured to the alumina tube with the platinum layer formed on its outer surface, by using different kinds of adhesive paste according to respective examples 1-10, as indicated in TABLES 1-1 and 1-2. The adhesive paste used in each example contained a glass powder, and a platinum powder as a metallic powder. A butyl carbitol acetate solution containing 10% by weight of ethyl cellulose was added to the platinum and glass powders, and these powders were mixed under respective conditions as indicated in TABLE 1-3, so that the platinum and glass powders were unevenly dispersed in the obtained adhesive paste. The adhesive paste contained 5 parts by weight of ethyl cellulose which serves as a binder, per 100 parts of the mixture of the platinum and glass powders. The viscosity of the adhesive paste was adjusted by heating the paste and thereby reducing the amount of the solvent in the solution indicated above. When the viscosity of the adhesive paste was insufficient, the amount of the solvent may be increased.

The thus prepared adhesive paste according to each example was applied to the opposite end portions of the alumina tube and the corresponding end portions of the lead wires. Then, the lead wires were inserted by suitable distances into the opposite end portions of a central bore of the alumina tube, and the applied adhesive paste was dried, so that the lead wires were fixed in place with respect to the alumina tube. The thus prepared assembly of the alumina tube with the lead wires secured thereto was then fired on a belt furnace, under respective conditions as indicated in TABLE 1-3. The firing operation was conducted with a 60-minute cycle time. The assembly of Example 8 was fired under a nitrogen atmosphere including 0.1% of oxygen, while the assemblies of the other examples were fired in the air. After the firing operation, a protective coating layer made of a glass material was formed on the outer circumferential surface of the alumina tube. In this manner, Examples 1-10 of the detecting element of the invention were obtained.

In Examples 1-8 of the present detecting element, the adhesive layer was formed of an adhesive paste which contained 30% by volume of Pt or Pt-Pd powder and 70% by volume of glass powder, as indicated in TABLES 1-1 and 1-2. After the firing operation, the resistivity of all of these examples was held within a range from $3 \times 10^4$ Ωcm to $5 \times 10^4$ Ωcm. Example 9 which uses the adhesive paste including 15% by volume of Pt powder had resistivity of $8 \times 10^{-4} \sim 10 \times 10^4$ Ωcm, and Example 10 which uses the adhesive paste including 45% by volume of Pt powder had resistivity of $1 \times 10^4 \sim 3 \times 10^4$ Ωcm.

TABLE 1-1

| | Metallic Powder | | Glass Powder | |
|---|---|---|---|---|
| Ex. No. | Content (vol %) | Grain Size and Powder Form | Content (vol %) | Grain Size and Powder Form |
| 1 | 30 | Pt powder of 0.3 μm grain size in aggregates of about 5 μm size | 70 | Powder of 1.5 μm grain size in aggregates of about 8 μm size |
| 2 | 30 | Pt powder of 0.3 μm grain size | 70 | Powder of 1.5 μm grain size |

TABLE 1-1-continued

| | Metallic Powder | | Glass Powder | |
|---|---|---|---|---|
| Ex. No. | Content (vol %) | Grain Size and Powder Form | Content (vol %) | Grain Size and Powder Form |
| | | in aggregates of about 5 μm size | | in aggregates of about 8 μm size |
| 3 | 30 | Pt powder of 0.3 μm grain size in aggregates of about 5 mm size | 70 | Powder of 1.5 μm grain size in aggregates of about 8 μm size |
| 4 | 30 | 50% Pt powder of 5.0 μm grain size + 50% Pt powder of 0.3 μm grain size | 70 | Powder of 5.0 μm grain size |
| 5 | 30 | Pt powder of 10.0 μm grain size in thin flat form | 70 | Powder of 3.0 μm grain size |

TABLE 1-2

| | Metallic Powder | | Glass Powder | |
|---|---|---|---|---|
| Ex. No. | Content (vol %) | Grain Size and Powder Form | Content vol %) | Grain Size and Powder Form |
| 6 | 30 | Pt powder of 0.5 μm grain size in elongate form (length: 20 μm) | 70 | Powder of 5.0 μm grain size |
| 7 | 30 | Pt powder of 1.5 μm grain size | 70 | Powder of 5.0 μm grain size |
| 8 | 30 | Pt powder of 0.3 μm grain size + Pd powder in aggregates of 2.0 μm size | 70 | Powder of 5.0 μm grain size |
| 9 | 15 | Pt powder of 0.3 μm grain size in aggregate form | 80 | Powder of 1.5 μm grain size in aggregate form |
| 10 | 45 | Pt powder of 0.3 μm grain size in aggregate form | 55 | Powder of 1.5 μm grain size in aggregate form |

TABLE 1-3

| Example No. | Conditions for Preparing Paste | Conditions for Firing |
|---|---|---|
| 1 | mixing powders for 15 min. in agate mortar | 780° C. × 3 min. |
| 2 | mixing powders for 5 min. in agate mortar, and milling 5 times with 3 rollers | 780° C. × 3 min. |
| 3 | mixing powders in polyethylene vessel, and adjusting viscosity of the obtained paste | 780° C. × 3 min. |
| 4 | mixing powders for 15 min. in agate mortar | 680° C. × 3 min. |
| 5 | mixing powders for 15 min. in agate mortar | 680° C. × 3 min. |
| 6 | mixing powders for 15 min. in agate mortar | 680° C. × 3 min. |
| 7 | mixing powders for 15 min. in agate mortar | 680° C. × 3 min. |
| 8 | mixing powders for 15 min. in agate mortar | 680° C. × 3 min. |
| 9 | mixing powders for 15 min. in agate mortar | 780° C. × 3 min. |
| 10 | mixing powders for 15 min. in agate mortar | 780° C. × 3 min. |

These examples were tested in respect of the bonding strength between the respective adhesive layers and the lead wires. The bonding strength was defined as a force required to remove or separate the lead wires from the adhesive layers. The test indicated that the adhesive layers of all of the examples exhibited excellent bonding strength. When a cut surface of the adhesive layer of each detecting element was observed by a scanning electron microscope, it was recognized in all of the examples that the glass and metal components were locally unevenly present in the adhesive layer, that is, coherent masses of the glass particles and coherent masses of the platinum (metal) particles were locally unevenly distributed in the adhesive layer, as illustrated in FIGS. 3(a) and 3(b).

As a comparative example, a detecting element similar to that of Example 1 was produced by using an adhesive paste which was prepared by mixing the platinum powder and the glass powder for a relatively long time so that the platinum and glass powders were uniformly distributed or dispersed in the adhesive paste. The adhesive layer of the comparative example exhibited extremely increased resistivity, and relatively low bonding strength, as compared with that of the detecting element of Example 1.

Further examples of the present detecting element were prepared in the same manner as described above, except that the platinum powder used as a metallic powder was replaced by a powder of an alloy such as Pt-Rh and Pt-Ni, or by a powder of a mixture of metals, such as (Pt+Au), (Pt+Ag), (Ag+Au), and (Ag+Pd), and that the glass powder was made of a glass material whose working temperature was 620° C. or 850° C. The adhesive layers of these examples also exhibited excellent bonding strength and sufficiently reduced resistivity.

EXAMPLE 11

Some specimens of the present detecting element similar to Example 1 were produced by using an adhesive paste which contained the platinum powder and the glass powder in different proportions. These specimens were tested on the resistivity of the adhesive layers, and the bonding strength between the adhesive layers and the lead wires, which was defined as a pulling force (tensile force) required to remove the lead wires from the adhesive layers. The test results are indicated in the graph of FIG. 4 in relation to the proportion of the platinum and glass powders.

Figure 4:
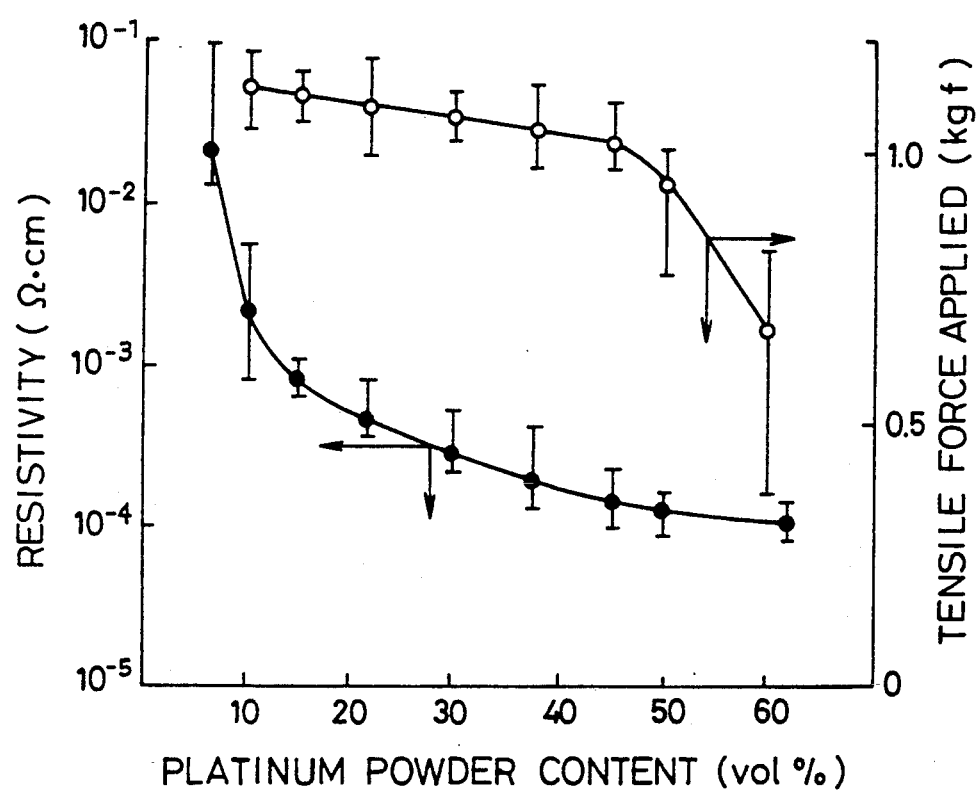
FIG. 4 is a graph representing a relationship between the content of a platinum powder contained in the adhesive layer, and the resistivity and the bonding strength of the adhesive layer.

It will be understood from the results indicated in the graph of FIG. 4 that the specimens exhibited sufficiently reduced resistivity of the adhesive layer, and excellent bonding strength between the adhesive layer and the lead wire, when the volume of the glass component contained in the adhesive layer is more or less larger than that of the platinum component. If the volume of the platinum powder amounts to 60% or more of the total volume of the adhesive layer, the strength of adhesive bonding is largely reduced, and the variation in the strength tends to be large. If the volume of the platinum powder is 10% or less of the total volume of the adhesive layer, the resistivity of the adhesive layer tends to be unstable.

What is claimed is:

1. A detecting element for a thermal flow meter, comprising:

a support having a bearing surface;

an electrically resistive body formed on said bearing surface of said support;

an electrical conductor which is fixedly secured to said support by means of an adhesive; and an adhesive layer made of said adhesive, said conductor being electrically connected to said electrically resistive body through said adhesive layer, said adhesive layer consisting essentially of a glass component and a metal component, such that said glass component has a larger volume than said metal component, and such that the glass and metal components are unevenly distributed in said adhesive layer.

2. A detecting element according to claim 1, wherein the volume of said glass component is held within a range of 55%~90% of the total volume of said adhesive layer.

3. A detecting element according to claim 1, wherein said adhesive layer has a plurality of glass-rich portions formed solely of said glass component, as viewed in cross section of said adhesive layer, such that the total cross sectional area of said glass-rich portions each having at least 20 $\mu m^2$, is at least 100 $\mu m^2$, per 2500 $\mu m^2$ of a cross sectional area of said adhesive layer.

4. A detecting element according to claim 3, wherein said total cross sectional area of said glass-rich portions is at least 500 $\mu m^2$, per 2500 $\mu m^2$ of the cross sectional area of said adhesive layer.

5. A detecting element according to claim 1, wherein said metal component is selected from the group consisting of pure metals of the platinum group, and alloys thereof.

6. A detecting element according to claim 1, wherein said glass component is selected from the group consisting of borosilicate glass, alkali glass, glass containing zinc, glass containing magnesia, lead glass, phosphate glass, and crystallized glasses thereof.

7. A detecting element according to claim 1, wherein said support is made of a ceramic material.

8. A detecting element according to claim 7, wherein said support is made of alumina.

9. A detecting element according to claim 1, wherein said support takes the form of a tube which has an outer circumferential surface as said bearing surface on which said electrically resistive body is formed.

10. A detecting element according to claim 1, wherein said electrically resistive body comprises a thin film of platinum.

* * * * *